(12) United States Patent
Le Croller et al.

(10) Patent No.: US 9,779,310 B2
(45) Date of Patent: Oct. 3, 2017

(54) METHOD AND DEVICE FOR DETECTING MUZZLE FLASH OF LIGHT FIREARMS

(71) Applicant: MBDA FRANCE, Le Plessis-Robinson (FR)

(72) Inventors: David Le Croller, Paris (FR); Thierry Teodoro, Paris (FR); Jean-Luc Assouly, Fresnes (FR); Pierre Garrigues, Versailles (FR)

(73) Assignee: MBDA FRANCE, Le Plessis-Robinson (FR)

( * ) Notice: Subject to any disclaimer, the term of this patent is extended or adjusted under 35 U.S.C. 154(b) by 0 days.

(21) Appl. No.: 14/901,961

(22) PCT Filed: Jun. 26, 2014

(86) PCT No.: PCT/FR2014/000147
§ 371 (c)(1),
(2) Date: Dec. 29, 2015

(87) PCT Pub. No.: WO2015/001202
PCT Pub. Date: Jan. 8, 2015

(65) Prior Publication Data
US 2016/0358026 A1    Dec. 8, 2016

(30) Foreign Application Priority Data

Jul. 2, 2013    (FR) ..................... 13 01562

(51) Int. Cl.
| G06K 9/00 | (2006.01) |
| G01J 1/44 | (2006.01) |
| G06K 9/20 | (2006.01) |
| G06K 9/62 | (2006.01) |
| H04N 5/225 | (2006.01) |

(52) U.S. Cl.
CPC ............ *G06K 9/00771* (2013.01); *G01J 1/44* (2013.01); *G06K 9/00973* (2013.01); *G06K 9/209* (2013.01); *G06K 9/6212* (2013.01)

(58) Field of Classification Search
CPC ............... G06K 9/00; G01J 1/00; F41A 21/00
USPC ........ 382/103, 107, 236; 348/310, 169, 170, 348/171, 172, 352
See application file for complete search history.

(56) References Cited

U.S. PATENT DOCUMENTS

| 5,596,509 | A | * | 1/1997 | Karr ........................... F41J 5/10 235/411 |
| 6,590,611 | B1 | * | 7/2003 | Ishida .................. H04N 3/1568 250/208.1 |
| 2001/0002045 | A1 | | 5/2001 | Fossum |

FOREIGN PATENT DOCUMENTS

| EP | 0 707 416 A2 | 4/1996 |
| WO | 00/69166 A2 | 11/2000 |

OTHER PUBLICATIONS

Cavallaro, A., "Change Detection for Object Segmentation," in Belbachir, A., "Smart Cameras," Springer, New York, USA, XP002720243, ISBN: 978-1-4419-0952-7, pp. 190-194, Jan. 1, 2010.

(Continued)

*Primary Examiner* — Abolfazl Tabatabai
(74) *Attorney, Agent, or Firm* — Christensen O'Connor Johnson Kindness PLLC

(57) ABSTRACT

The invention comprises using a photodetector that it sensitive in the MWIR band, performing image differencing on two successive images at a time, and defining thresholds for said differences in order to extract only those exceeding the threshold used.

11 Claims, 2 Drawing Sheets

(56) References Cited

OTHER PUBLICATIONS

Figure 1:
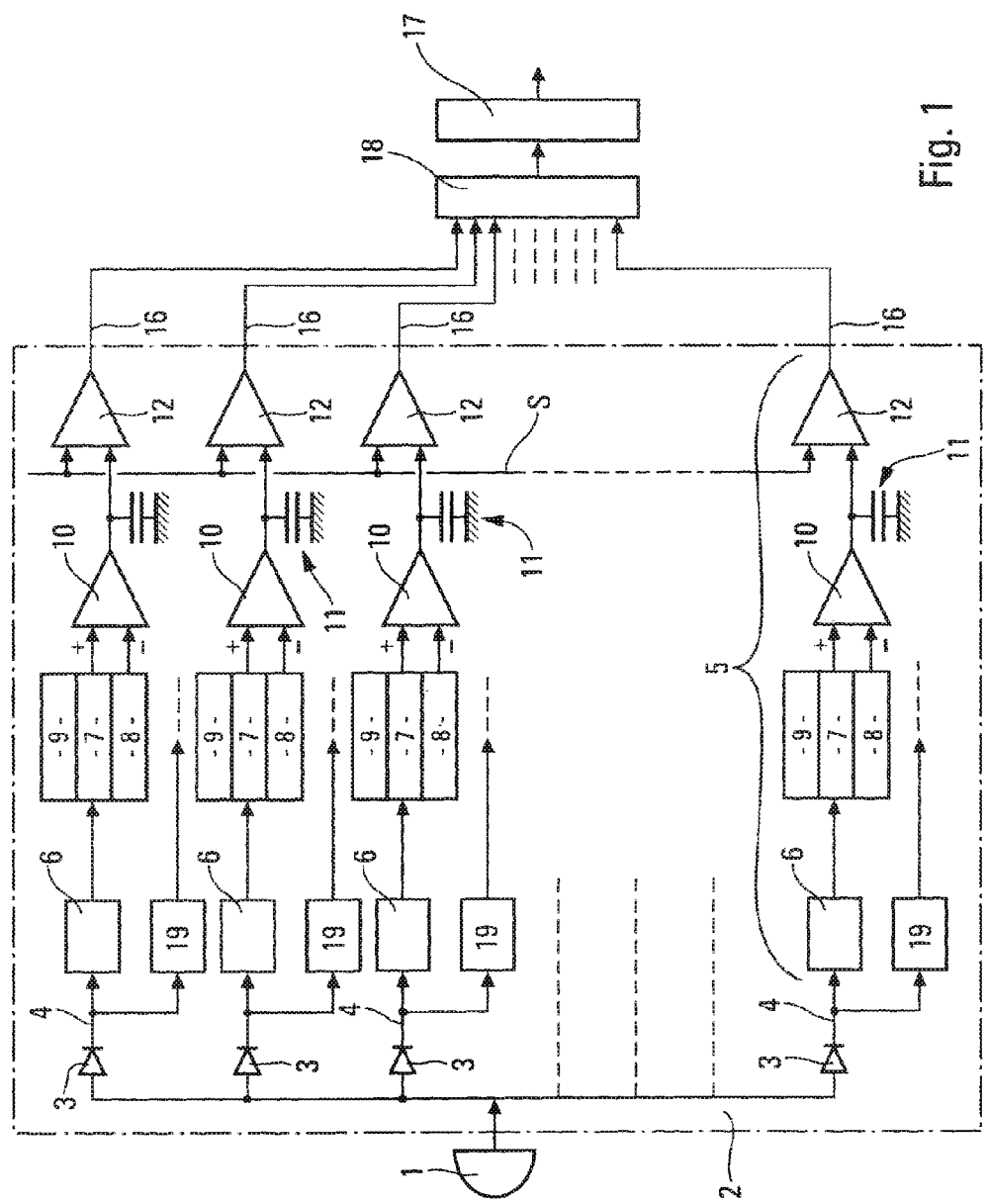

El Gamal, A., and Eltoukhy, H., "CMOS Image Sensors," IEEE Circuits and Devices Magazine, 21(3):6-20, May 1, 2005.
El Gamal, A., et al., "Pixel-Level Processing—Why, What, and How?" Proceedings of the International Society for Optical Engineering vol. 3650, 12 pages, Jan. 28, 1999.
International Search Report mailed Sep. 17, 2014, issued in corresponding International Application No. PCT/FR2014/000147, filed Jun. 26, 2014, 3 pages.

* cited by examiner

METHOD AND DEVICE FOR DETECTING MUZZLE FLASH OF LIGHT FIREARMS

The present invention relates to a method and to a device for detecting muzzle flashes from light weapons, such as infantry weapons.

Although not exclusively, the present invention is particularly suitable for being used on board land vehicles, aircraft and military helicopters that are likely to come under fire from light weapons on the ground.

Indicators of fire from light weapons on the basis of the acoustic detection of this fire are already known. However, these acoustic indicators have a high level of false alarms and too long a response time. In addition, the goniometric information therefrom is particularly imprecise.

As a result, it would be useful to be able to detect such fire using infrared photodetectors, as is the case for missiles. However, infrared detection of muzzle flashes from light weapons presents difficulties, in particular due to the brevity (a few ms) and the low level (several W per steradian) of the apparent intensity of the muzzle flash from these light weapons, as well as the bullets that they fire. In order to overcome these drawbacks, the following considerations could be made:

either increasing the frequency of acquiring and unloading the images provided by the infrared photodetector, but this would thus represent a volume of data to be transferred and processed that would encounter technological limitations for a "full tv" solution, or increasing the frequency of acquiring the images by the infrared photodetector, while only unloading these images for a set of several consecutive acquisitions, but in this case, the useful signal would get lost in significant landscape noise.

The problem addressed by the present invention is to overcome these drawbacks and to allow the muzzle flash from light weapons and of the bullets that they fire to be efficiently detected by means of infrared photodetectors.

For this purpose, according to the invention, the method for detecting muzzle flashes from light weapons by means of an infrared matrix photodetector is remarkable in that:

an infrared matrix photodetector is implemented that is sensitive in the MWIR band and reacts to infrared radiation of which the wavelengths are between 3 and 5 μm, and the sequence of the following operations is carried out in the infrared photodetector:
acquiring, at a frequency of approximately 1000 Hz, successive images of the landscape in which said light weapons may be located,
calculating the differences between each of said images and the preceding image,
thresholding said image differences by means of a threshold that is at least approximately representative of the noise of the landscape, and
extracting only said differences in the image portions that are above said threshold.

In fact, the applicant has observed that the muzzle flashes from the light weapons would mainly emit in the wavelengths between 3 and 5 μm. Therefore, the method of the invention is particularly optimal in terms of detecting these muzzle flashes.

It is noted that U.S. Pat. No. 5,596,509 implements an MWIR detector for determining the trajectory of bullets. The low image frequency (200 Hz) of the detector used does not make it possible to ensure the detection of a muzzle flash of several ms, it being possible for said muzzle flash to occur between two successive images. If, by chance, the muzzle flash occurs during the acquisition of an image by means of this known detector, the image of this muzzle flash would be contained entirely in the acquired image, and this excludes the redundancy provided by the present invention (see below).

Moreover, in the method of the invention, the muzzle flashes and the fired bullets are picked up by the only differences in the consecutive image portions that exceed the threshold, such that the information extracted is particularly limited and consists only of the useful signal.

The differences in the consecutive image portions that exceed the threshold may be unloaded immediately after thresholding, for example at a frequency of approximately 1000 Hz, or may be stored and collected in a buffer zone, and then may be unloaded thereafter at a frequency of less than 1000 Hz.

The present invention also relates to a device for detecting muzzle flashes from light weapons by means of a sequential infrared matrix photodetector, comprising a plurality of photosites, each of which forms a portion of the image of the landscape observed by said photodetector, this device being remarkable in that:

said photodetector is sensitive in the mid-wave infrared (MWIR) band and reacts to infrared radiation of which the wavelength is between 3 and 5 μm, and is capable of acquiring successive images at a frequency of approximately 1000 Hz;

a measuring circuit is associated with each of said photosites, comprising:
first means for storing the corresponding portion of the current image,
second means for storing the corresponding portion of the preceding image,
means which are capable of discerning the difference between said portion of the current image and said portion of the preceding image,
third means for storing said image difference, and
means for thresholding said image difference by means of a threshold that is at least approximately representative of the noise of said landscape, and
means are provided for unloading only the differences in the image portions that are above said threshold.

For example, said first, second and third storage means comprise capacitors.

Advantageously, said measuring circuit that is associated with each photosite also comprises a transfer register, for example of the shift register type, controlling said first and second storage means in order to pass, for each operating sequence of the photodetector, said portion of the current image of the preceding sequence from said first storage means to said second storage means. Therefore, said portion of the current image of the preceding sequence forms said portion of the preceding image and said first storage means can store said portion of the current image of the sequence in progress, with a view to the production of said image difference.

Preferably, said threshold is adjustable in order to be able to adapt the detection device of the invention to different landscapes.

Moreover, it is advantageous that a signal receiver that is arranged in parallel in the corresponding measuring circuit is associated with each photosite. Therefore, the detection device according to the present invention can be easily coupled to, and even integrated in, another detector, for example to or in a hostile-missile detector.

It is noted that the detection device according to the present invention, which is capable of detecting the brief and low-intensity infrared signals of muzzle flashes or bullets, may a fortiori detect less brief and higher-intensity infrared signals.

The figures of the accompanying drawings will give a clear understanding of how the invention can be implemented. In these figures, identical reference numerals designate similar elements.

FIG. 1 is a block diagram of an embodiment of the device according to the present invention.

Figure 2:
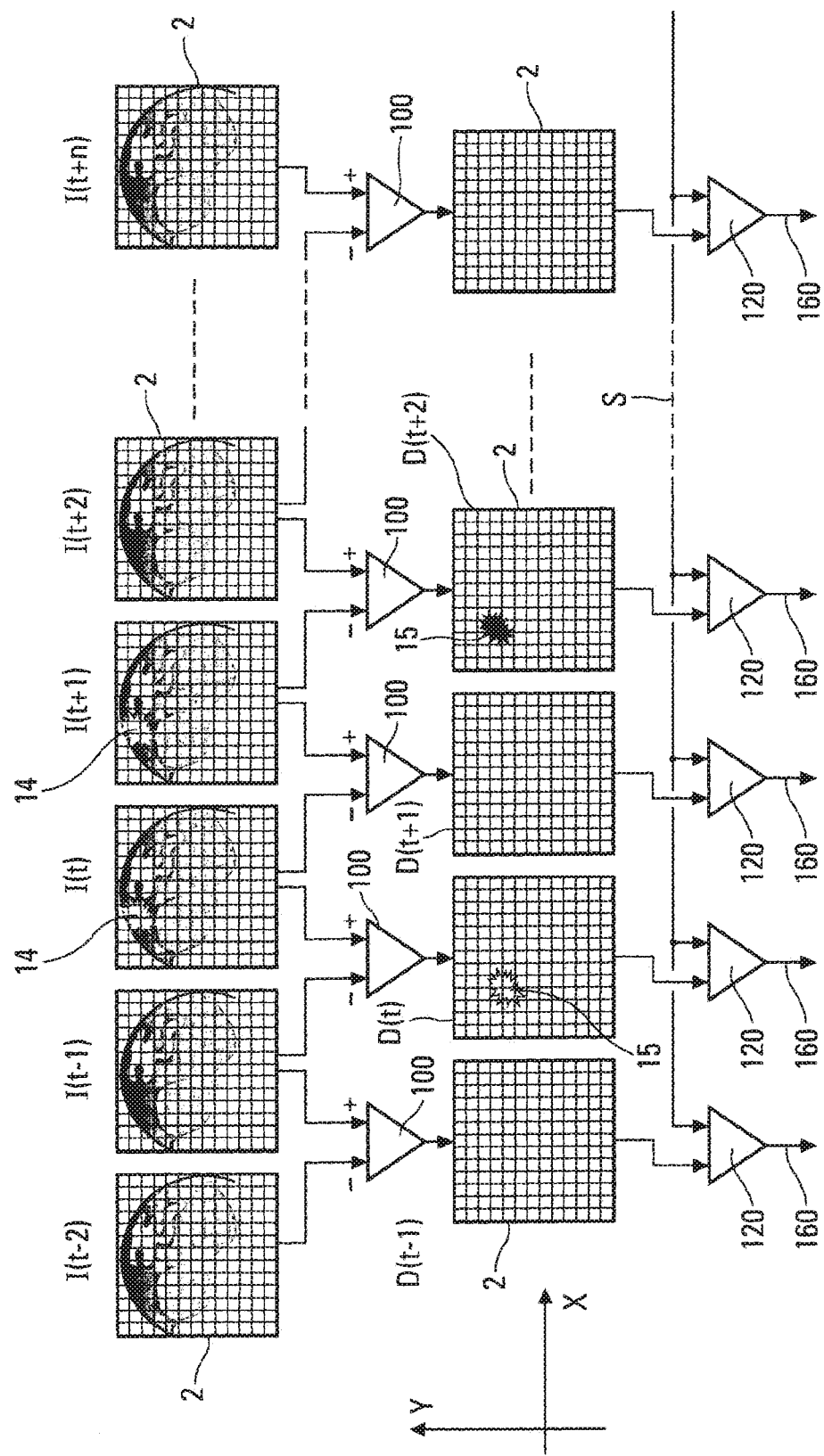

FIG. 2 schematically shows the operation of the device from FIG. 1.

The device according to the present invention, which is shown schematically in FIG. 1 and is capable of detecting the muzzle flash from light infantry weapons, comprises a hypergon lens 1, generally referred to as a fisheye lens, and an infrared matrix photodetector 2, which receives the luminous flux captured by the lens 1.

The infrared photodetector 2 reacts to the infrared radiation of the portion of the MWIR spectrum in which the wavelengths are between 3 and 5 μm. The infrared photodetector 2 comprises a plurality of photosites 3 which are distributed in rows and columns in order to form a matrix of infrared detectors. For example, the photodetector 2 may be made of mercury cadmium telluride, such as those known commercially by the names URANUS MW and SCORPIO MW from the company SOFRADIR and comprising a matrix of 640×512 photosites.

As is known and is shown in FIG. 2, at successive moments . . . t−2, t−1, t, t+1, t+2, . . . t+n, . . . , all the electrical signals occurring at the outputs 4 of the photosites 3 of the photodetector 2 sequentially form successive images . . . I(t−2), I(t−1), I(t), I(t+1), I(t+2), . . . I(t+n), . . . of the field observed by the lens 1. The frequency of said images is for example 1000 Hz.

As can be seen in FIG. 1, the output 4 of each of the photosites 3 is connected to a circuit 5 comprising:
- an injection stage 6,
- first means for storing electrical signals 7, comprising for example at least one capacitor (not shown),
- second means for storing electrical signals 8, comprising for example at least one capacitor (not shown),
- a transfer register 9, for example of the shift register type, which is capable, for each sequence of the photodetector 3, of transferring the content of the first storage means 7 into said storage means 8, such that, at a given moment, each of said first storage means 7 contains a portion of the current image of the landscape observed by the lens 1, while each of said second storage means 8 contains a portion of the preceding image of said landscape,
- a subtractor 10, which is capable of discerning the difference between the content of said first and second storage means 7 and 8,
- third storage means 11, comprising at least one capacitor that is capable of storing the difference signal occurring at the output of the subtractor 10, and
- thresholding means 12, which are capable of only letting past the difference signals (stored in the third storage means 11) which are above an adjustable threshold S that is at least approximately representative of the noise of the landscape during observation by the lens 1.

Therefore, as shown schematically in FIG. 2, the set 100 of subtractors 10 successively discerns the difference between the images I(t−1) and I(t−2), and then the difference between the images I(t) and I(t−1), and then the difference between the images I(t+1) and I(t), etc.

The set 100 of subtractors 10 therefore produces difference images D(t−1), D(t), D(t+1) etc. which are empty if the successive images I(t−2), I(t−1), I(t), etc., are identical. However, if a muzzle flash from a light weapon occurs during the images I(t) and I(t+1), luminous marks 14 appear on said images. By means of the subtractors 10, these luminous marks 14 are shown in the form of marks 15 on the difference images D(t) and D(t+2) in question, since they only appear due to differences in the images taken.

These marks 15 which are thus extracted can be localised by their coordinates X and Y on the photodetector 2 and the intensity thereof can be thresholded by the set 120 of the thresholding means 12.

Therefore, only the electrical signals corresponding to marks 15 of which the intensity is above the threshold S are extracted at the set 160 of outputs 16 of the thresholding means 12.

These thresholded electrical signals may be unloaded by an unloading device 17, immediately after thresholding, for example at a frequency of 1000 Hz.

However, as shown by FIG. 1, said thresholded electrical signals thus extracted may be stored and collected in a buffer zone 18, from which they can be unloaded at a frequency of less than 1000 Hz.

Whatever the unloading method, the image-difference portions that have exceeded the threshold and are characterised by their coordinates X and Y on the photodetector and their intensity are transferred to the user.

Moreover, as can be seen in FIG. 1, a signal receiver 19 that is connected to the output 4 of said photosite 3 and is arranged in parallel in the corresponding measuring circuit 5 is associated with each photosite of the photodetector 2.

Therefore, the detection device according to the invention can be easily coupled to or integrated in another detector.

The invention claimed is:

1. Method for detecting muzzle flashes from light weapons by an infrared matrix photodetector that is sensitive in the mid wave infrared radiation (MWIR) band and reacts to infrared radiation of which the wavelengths are between 3 and 5 μm, the method comprising:
   acquiring, by the infrared matrix photodetector at a frequency of approximately 1000 Hz, successive images of a landscape in which said light weapons may be located,
   calculating, by the infrared matrix photodetector, differences between each of said images and a preceding image,
   thresholding, by the infrared matrix photodetector, said image differences by means of a threshold that is at least approximately representative of noise of said landscape, and
   extracting, by the infrared matrix photodetector, only said differences in image portions that are above said threshold.

2. Method according to claim 1, wherein the differences in the image portions that are above said threshold are unloaded immediately after thresholding.

3. Method according to claim 2, wherein an immediate-unloading frequency of said image differences is approximately 1000 Hz.

4. Method according to claim 1, wherein, after thresholding, the differences in the image portions that are above said threshold are stored and collected in a buffer zone.

5. Method according to claim 4, wherein an unloading frequency of said image differences outside the buffer zone is less than 1000 Hz.

6. Device for detecting muzzle flashes from light weapons, comprising:
a sequential infrared matrix photodetector comprising a plurality of photosites, each of which forms a portion of an image of a landscape observed by said photodetector, wherein said photodetector is sensitive in the mid wave infrared radiation (MWIR) band and reacts to infrared radiation of which the wavelength is between 3 and 5 µm, and is capable of acquiring successive images at a frequency of approximately 1000 Hz; and
a measuring circuit associated with each of the photosites of said photodetector, the measuring circuit comprising:
first means for storing the corresponding portion of a current image,
second means for storing the corresponding portion of a preceding image,
means for discerning a difference between said portion of the current image and said portion of the preceding image,
third means for storing said image difference, and
means for thresholding said image difference by a threshold that is at least approximately representative of noise of said landscape, and
means for unloading only the differences in the image portions that are above said threshold.

7. Device according to claim 6, wherein said first, second and third means for storing comprise capacitors.

8. Device according to claim 6, wherein said first and second means for storing are controlled by a transfer register that allows, for each operating sequence of said photodetector, said portion of the current image of a preceding sequence to pass from said first means for storing to said second means for storing.

9. Device according to claim 6, wherein said threshold is adjustable in order to be able to be adapted to different landscapes.

10. Device according to claim 6, wherein a signal receiver that is arranged in parallel in said measuring circuit is associated with each photosite.

11. A sequential infrared matrix photodetector, said photodetector being sensitive in the mid wave infrared radiation (MWIR) band, reactive to infrared radiation of which the wavelength is between 3 and 5 µm, and capable of acquiring successive images at a frequency of approximately 1000 Hz, the photodetector comprising:
a plurality of photosites, each of which forms a portion of an image of a landscape observed by said photodetector; and
a measuring circuit associated with each of the photosites, wherein the measuring circuit is configured to: (1) discern a difference between signals indicative of a portion of a current image and a portion of a preceding image; (2) compare a threshold to one or more signals indicative of said image difference, the threshold being at least approximately representative of noise of said landscape; and (3) output said image difference signals that are above the threshold.

* * * * *